L. B. CRECELIUS.
SYSTEM OF BONDING RAILS.
APPLICATION FILED APR. 10, 1914.
1,327,947.
Patented Jan. 13, 1920.
2 SHEETS—SHEET 1.
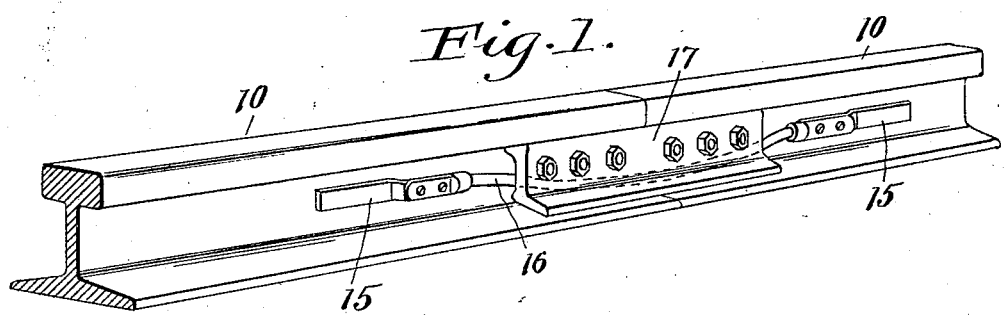
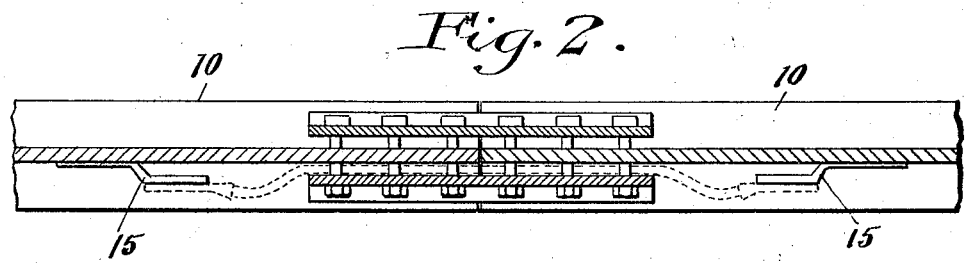
Witnesses
E. B. Gilchrist
L. I. Porter
Inventor
Lawrence P. Crecelius
by Thurston & Kwis
Attys.

L. B. CRECELIUS.
SYSTEM OF BONDING RAILS.
APPLICATION FILED APR. 10, 1914.
1,327,947.
Patented Jan. 13, 1920.
2 SHEETS—SHEET 2.
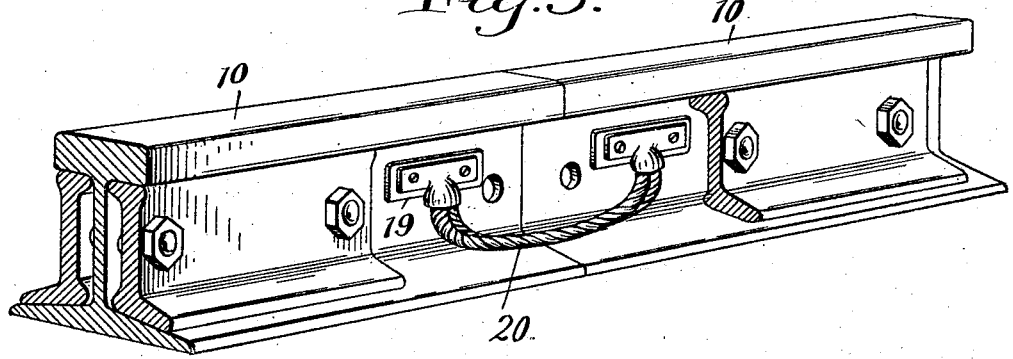
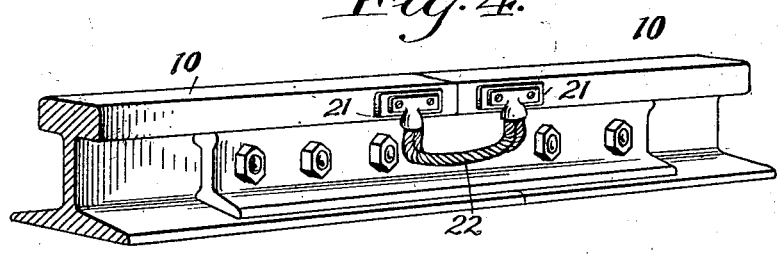
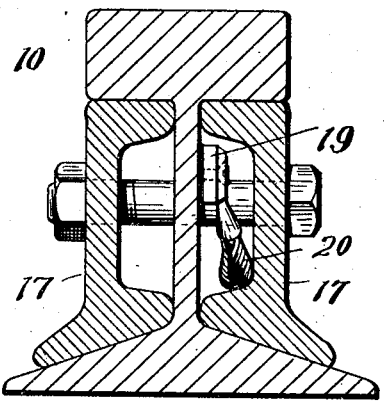
Witnesses.
E. B. Gilchrist
L. I. Porter
Inventor
Lawrence P. Crecelius
by Thurston & Kwis
Attys.

UNITED STATES PATENT OFFICE.

LAWRENCE P. CRECELIUS, OF CLEVELAND, OHIO, ASSIGNOR TO THE ELECTRIC RAILWAY IMPROVEMENT COMPANY, OF CLEVELAND, OHIO, A CORPORATION OF OHIO.

SYSTEM OF BONDING RAILS.

1,327,947.  Specification of Letters Patent.  Patented Jan. 13, 1920.

Application filed April 10, 1914. Serial No. 830,858.

*To all whom it may concern:*

Be it known that I, LAWRENCE P. CRECELIUS, a citizen of the United States, residing at Cleveland, in the county of Cuyahoga and State of Ohio, have invented a certain new and useful Improvement in Systems of Bonding Rails, of which the following is a full, clear, and exact description.

This invention relates to a system of bonding rails.

At the present time, considerable difficulty is experienced in bonding rails of subways, electrified steam railroads, city lines, etc., with such bonds and devices which are at present available, because either the joint or union between the bond and the steel rail must be made by mechanical means, and is therefore subject to rapid deterioration, or traffic is seriously interfered with, because of the obstruction offered by the apparatus employed to braze or weld the bond to the rail.

A soft soldered joint between the bond and rail is no longer used to any extent in practice, because very little mechanical strength is secured in the union of a rail and copper bond by this means, owing to the extreme difficulty of soft soldering to steel surfaces. A soft soldered union between the steel rail and copper bond is particularly impracticable at the present time, in view of the fact that high carbon and special alloy steel rails are being used, and it is more difficult to soft solder copper to steels of this character than to softer steel. It is to be understood, however, that while copper cannot be effectively soft soldered to steel, no difficulty is encountered in soft soldering copper to copper, and thereby securing a very effective union from mechanical and electrical standpoints.

The system of bonding constituting the subject matter of this application has for its chief object the elimination of the difficulties above stated.

In carrying out my invention, terminal members of copper or equivalent conducting material are intimately attached to the rails, preferably by brazing or welding before they are installed, the brazing or welding being accomplished by any suitable apparatus or method, and after the rails are installed, these terminal members are united preferably by mechanical means and by soft soldering so that joints or union between the rail and bond or between the parts of the bond, having the requisite mechanical strength and conductivity are provided.

My invention may be further briefly summarized as consisting in the elements of the system of bonding described in the specification and set forth in the appended claims.

My improved system of bonding can be carried out in different ways and with numerous specifically different resulting constructions, some of which I have illustrated in the drawings, in which Figure 1 is a perspective view showing portions of two adjacent rails bonded in accordance with one form of my invention; Fig. 2 is a sectional view through the webs of the two rails shown in Fig. 1; Fig. 3 is a perspective view of portions of two rails bonded in accordance with my invention carried out in a somewhat different manner than shown in the preceding figures; Fig. 4 is an enlarged transverse sectional view through the rails showing the system of bonding of Fig. 3; and Fig. 5 is a perspective view similar to Figs. 1 and 3 showing a still further slight modification.

In accordance with my invention shown in Figs. 1 to 5 there is welded or brazed to each rail 10 near its end, a bond plate of copper or other good conducting material, these bond plates being welded or brazed to the rails prior to installation, and then after installation, the bond plates on the adjacent ends of the abutting or adjoining rails are connected by a bond which can be fastened to the plates by screws, rivets, or bolts, and are soft soldered by a blow torch or equivalent means. The mechanical fastening means, *i. e.*, the screws, bolts, or rivets are utilized to give the requisite mechanical strength, and the soft soldering is utilized to cause the joint to have the required electrical conductivity.

In Figs. 1 and 2, the bond plates which are welded or brazed to the rails, prior to installation, are shown at 15, and the bond which is fastened by screws and by soft soldering to these bond plates, is shown at 16. In this instance, the bond plates have offset portions to which the terminals of the bond are secured. By offsetting the portions of the bond plates to which the bond terminals are secured so that said portions of the plates are out of contact with the rail, the joints can be easily soft soldered, inasmuch as the heat is not conducted away from the joint very rapidly. Also in these same figures, the distance between the bond plates is somewhat greater than the length of the fish plate 17, and the bond is threaded between the fish plate and the rails. It is not essential, however, that the bond be placed between the fish plate and the rails, as it may extend from bond plate to bond plate outside of the fish plate.

It is not essential either that the distance between the bond plate be greater than the length of the fish plate, inasmuch as the entire bond, including the bond plates may be beneath the fish plate, in which event a much shorter bond may be employed. This is illustrated in Fig. 3, wherein a portion of the fish plate is broken away, and wherein the bond plates which are welded or brazed to the rails prior to installation are shown at 19, and the bond at 20. In this instance, the bond plates have no offset portions, but are from end to end brazed or welded to the rail, and the bond has T-shaped terminals which are subsequent to installation of the rails fastened by screws and by soft soldering to the bond plates.

It is not essential that the bond plates be brazed or welded to the web portions of the rails, for as illustrated in Fig. 5 they may be attached to the upper part or ball of the rail. In this figure, the bond plates shown at 21 are brazed or welded to the balls of the rails prior to installation, and after installation the bond 22 is fastened by screws and by soft soldering to the plates.

With any of the arrangements above described, the rails can be bonded in a very satisfactory manner, and in such a way that the bonds will last throughout the life of the rails, with less expense than is required, with the best bonding methods in use at the present time, and without the use of apparatus or appliances which interfere with traffic, and which are dangerous in their use upon or alongside the tracks of high speed electrified railways.

It will be apparent from the modifications above described, that the bonds or bonding means and the specific manner in which my invention is carried out, can be modified in numerous ways, I therefore do not desire to be limited to any particular details of construction or operation, except as I specifically limit myself in the appended claims.

Having thus described my invention, what I claim is:

1. In a system of bonding rails, in combination with a pair of adjoining rails, flat bond plates of good conducting material intimately attached to the rails, and a complete bond comprising a conductor with terminal sleeves, the latter having flat contact portions of considerable area lying flat against and secured to the outer faces of the bond plates.

2. In a system of bonding rails, in combination with a pair of adjoining rails, flat bond plates intimately attached to the rails and a bond having flattened terminals lying flatwise against and secured to the outer faces of the bond plates by soldering and by screws passing through the terminals into the bond plates.

In testimony whereof I hereunto affix my signature in the presence of two witnesses.

LAWRENCE P. CRECELIUS.

Witnesses:
A. F. KWIS,
L. I. PORTER.